June 7, 1932.  N. EMMONS, 3D  1,862,181
CULINARY APPARATUS
Filed March 22, 1929  8 Sheets-Sheet 3

Inventor
NELSON EMMONS, III,
By
Toulmin + Toulmin
Attorneys

Patented June 7, 1932

1,862,181

UNITED STATES PATENT OFFICE

NELSON EMMONS, 3D, OF DAYTON, OHIO, ASSIGNOR, BY MESNE ASSIGNMENTS, TO NELSON EMMONS, JR., AND JOSEPH W. GREEN, BOTH OF DAYTON, OHIO

CULINARY APPARATUS

Application filed March 22, 1929. Serial No. 349,241.

This invention relates to improvements in culinary apparatus for mixing and beating.

The apparatus is composed essentially of a base, a standard which supports thereon a tiltable head, the head carrying certain mechanism that operates a stirrer that stirs the contents of a bowl supported by the base and the standard.

It is particularly the object of this invention to provide an apparatus of this kind in which the standard is composed of two sections, one of which is attached to the base and rigid therewith, and the other which supports the head is tiltably supported by the lower section of the standard.

It is also an object of this invention to provide a base with a seat for the support of the bowl.

It is also an object of this invention to provide in addition in the bowl support in the base a second and auxiliary support therefor on the side of the standard. The standard support engages a coacting part on the side of the bowl to prevent any tilting or rocking of the bowl as it rests upon the seat in the base.

It is a further object of this invention to provide an operating shaft so constructed that there may be communicated from this shaft both a rotating and a gyrating motion. If it should be desired to stir the contents of the bowl by a gyrating motion the stirrer would be placed on one shaft, whereas if simple rotation were desired the stirrer would be placed on another shaft carried by the same part of the machine.

Another object of this invention is to provide a head in which all of the operating mechanism of the device is found, together with the motor which drives the stirrer or mixer. By this means there is provided a compact and unitary structure in the form of a head, which contains within the confines of the head all of the mechanism that is used for the purpose of operating and propelling the stirrer or mixer. The head is so constructed that the operating parts are entirely concealed, leaving a smooth outer surface unobstructed by any machinery or parts of the gearing.

It is an object of this invention to provide a direct drive from the motor shaft, to which there is geared a worm gear and the shaft that operates the gyrator.

It is a still further object of this invention to provide in combination with a stirrer in which there is a tiltable head, an attachment for attaching to the motor driven shaft for the purpose of operating ice cream freezers, fruit and meat grinders and crushers, and any other similar device.

It is a further object of this invention to provide in combination with a tiltable head a fixture therefor adapted to be used for the purpose of extracting juices from fruits, such as oranges, lemons and the like. All of these different devices are operated by the same power and same mechanism, with merely the shifting of the attachment from one part of the mechanism to another.

Further advantages of this invention will appear in connection with the following description, taken in connection with the drawings.

Referring to the drawings.

This apparatus is made of aluminum or any other suitable metal, and has for its particular features lightness, compactness and efficiency of operation. While it is preferable to use aluminum, or some other light metal, it is by no means intended that this apparatus shall be made of aluminum alone, but any other suitable metal may be used.

Figure 1:
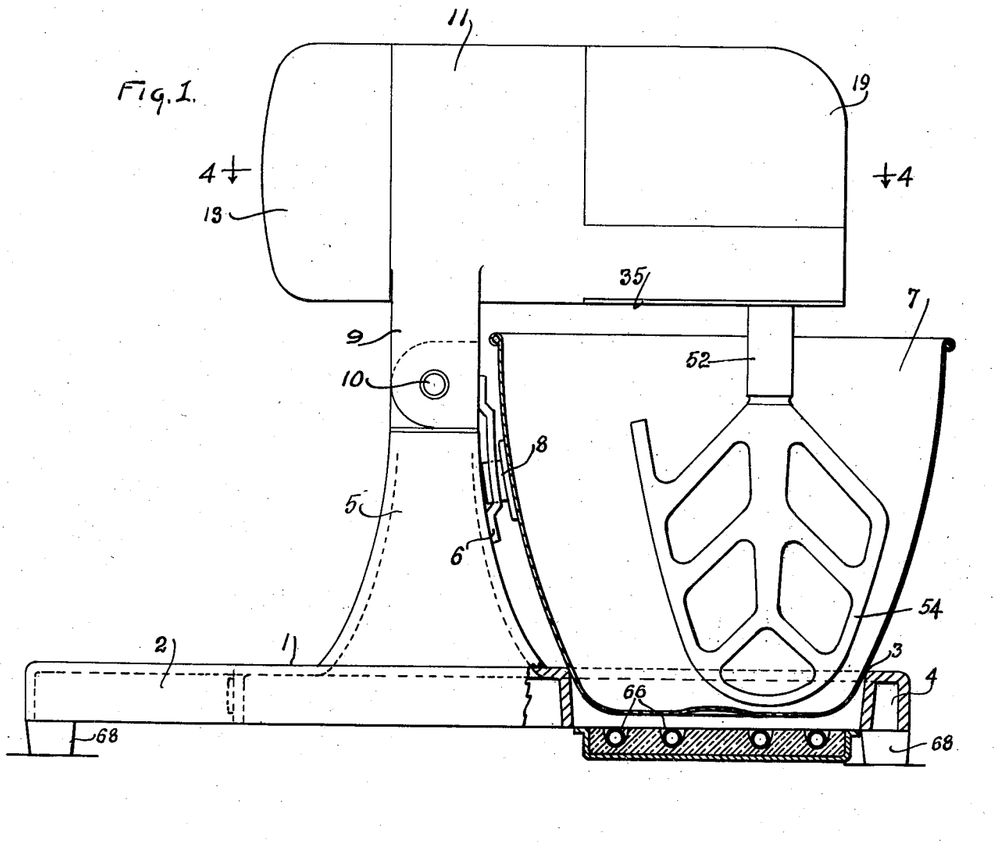
Figure 1 is a side view of the apparatus showing part of the base and the bowl in section.
Figure 2:
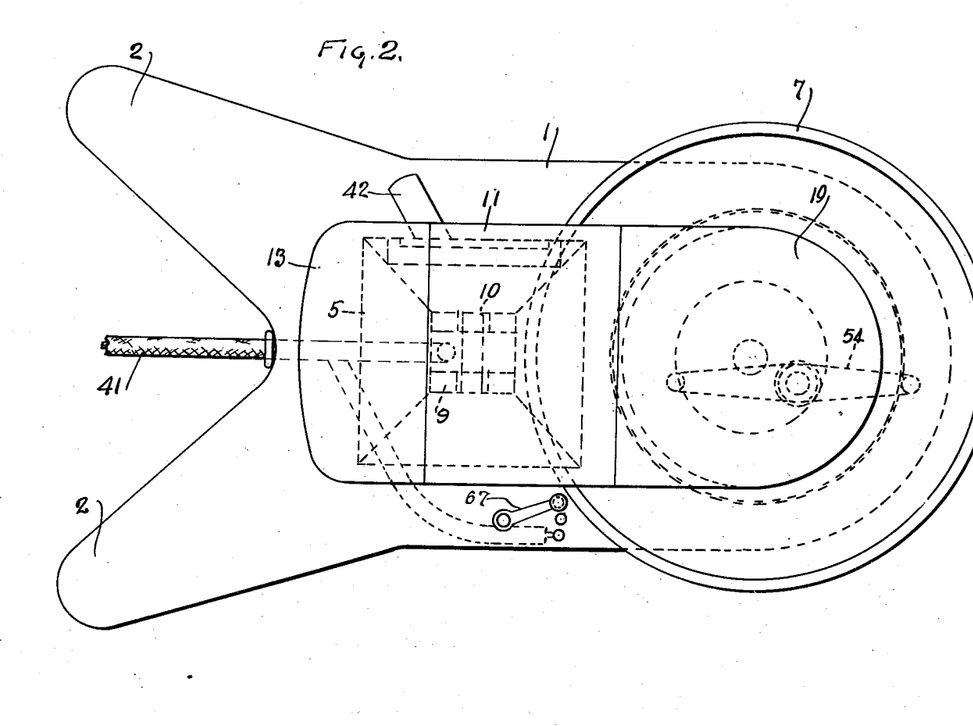
Figure 2 is a top plan view of the apparatus.
Figure 3:
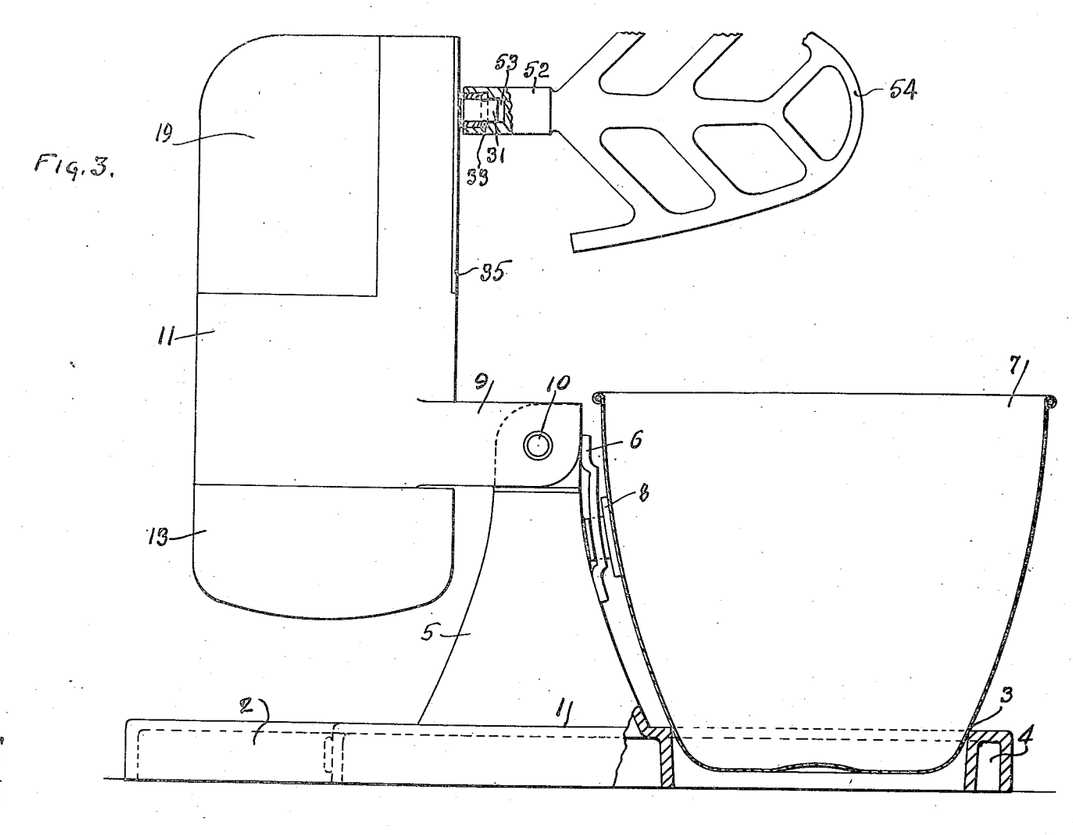
Figure 3 is a view similar to Figure 1, with the head thrown back and the stirrer removed from the bowl.

As shown in Figure 1, the numeral 1 is used to designate a base, which has extending rearwardly therefrom two prongs 2 that add to the extent of the base so as to prevent tilting and support the head when it is in its thrown-back and tilted position. In order to further support the head in the position shown in Figure 1 there is provided a forward extension, which provides a circular seat 3 for the support of the bowl. Around the margin of this circular seat there is a cavity 4, in the form of a trough, that might be used for the location of heating coils, or apparatus of some suitable kind.

Extending upward from the central part of the base is a lower standard 5. This standard has on the upper end thereof a slotted bracket 6. Resting in the circular seat formed in the base is a bowl 7, which has on one side thereof a bracket 8 adapted to fit within the slotted bracket 6 on the standard 5. By this means the bowl is not only supported in the seat on the base but is supported by the standard 5 so that it cannot be easily tilted or rocked or turned while in position on the seat. By having a double support of this kind the operation of the mixer on the contents of the bowl could not overturn the bowl or turn the bowl to one side so as to interfere with the operation of mixing and stirring.

To the upper part of the lower standard there is pivotally mounted an upper or tilting standard 9. This part of the standard is pivotally mounted to the lower part by means of a pivot 10. For the purpose of this pivot the lower standard is provided with a single ear to which the upper part of the bracket 6 is attached, while the upper standard 9 is provided with two ears that straddle the upper ear.

Integral with the upper standard is a housing 11. This housing may be of any suitable shape, and for the purpose of providing space and protection for the motor is hollowed out, as indicated by the numeral 12. This housing is made of solid material, such as that of which the other part of the apparatus is composed, and provides a cavity for the motor, indicated by the numeral 15. On one end of the housing, which is open for access to the motor, there is provided a cap 13, which is attached to and held to the housing by means of screws 14. This cap is rounded and of the same general shape as the adjacent part of the housing, and when in position on the housing forms a complete and smooth surface with the surface of the housing.

For the purpose of holding the motor in place there are provided screws 16, which pass through suitable openings in the wall of the housing and engage the motor for that purpose. The numeral 17 indicates the motor shaft, which has on the end thereof remote from the motor a worm 18. This part of the housing has the upper part thereof cut away, as indicated in Figure 1 by the numeral 19. This part may be removed so that access may be had to the gear and the operating structure found therein.

The worm on the motor shaft 17 engages with the worm gear 20, which is upon a vertical shaft 21. This vertical shaft 21 is supported in suitable bearing 22 in the part of the housing that is immediately beneath the gear housing 19. In addition to the bearing 22 this shaft is also supported by ball bearings 23 found in the gear housing 19. The gear 20 is upon shaft 21 and is held thereon by means of a bushing 20a and a pin 21a.

Figure 4:
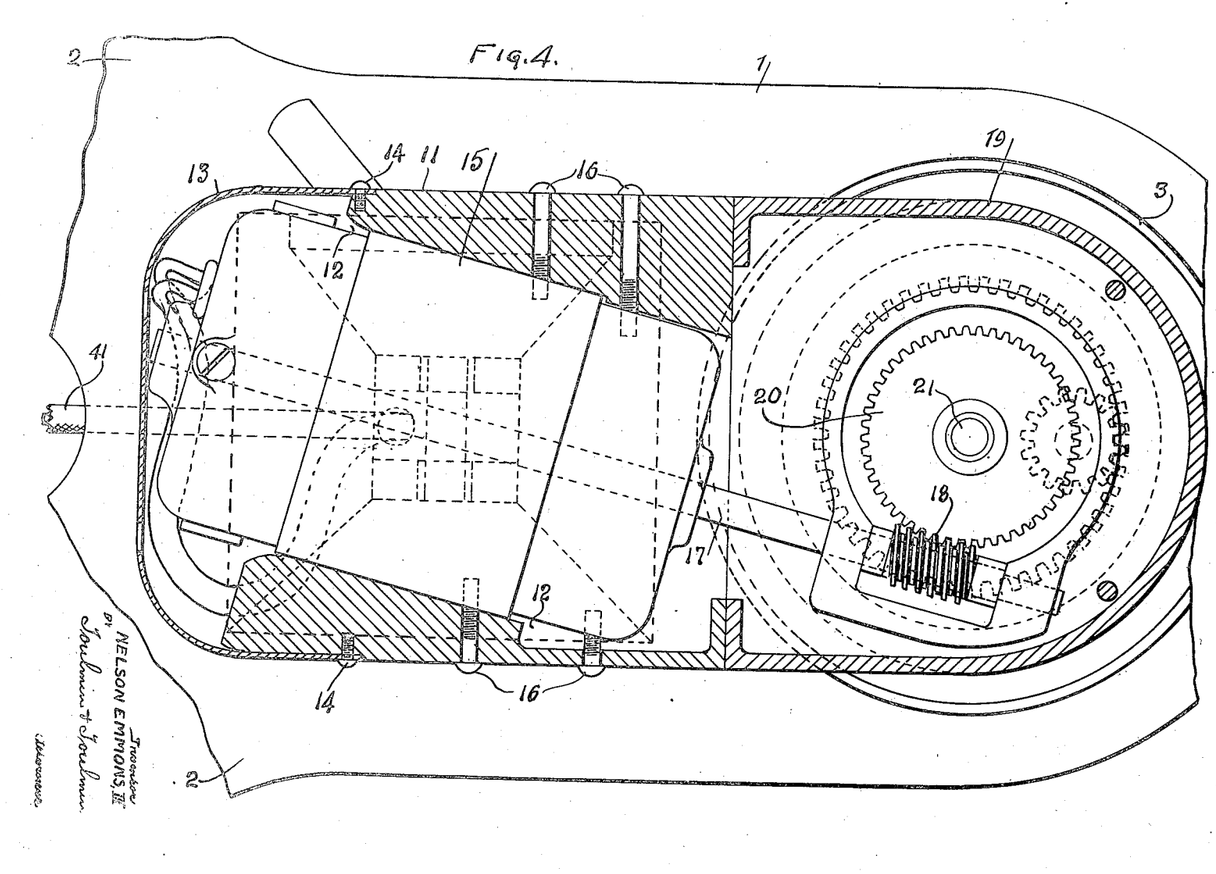
Figure 4 is a section on the line 4—4 of Figure 1.

In the preferred form as shown in Figure 4 the motor shaft is directly connected to the worm gear 20 for operating purposes, by means of a worm 18. In order to effect a direct drive between the motor shaft and the worm gear 20 and support the motor within the head so that the weight of the motor is properly distributed over the standard, the motor and motor shaft are arranged diagonally in the head. An inspection of Figure 4 shows that the motor in this position is supported directly over the standard when the head is horizontally arranged with respect to the standard. By this arrangement of the motor and the motor shaft a direct drive is effected by means of a worm and worm gear, and at the same time the motor is supported in the head so that there is a perfect equilibrium, and the motor has no tendency to tip the head to one side or the other.

The lower part of the casing of the head immediately beneath the shaft 21 and the gear 20 is hollowed out as indicated by the numeral 24, to form a cavity in which there is mounted an internally toothed ring 25. This ring is firmly held by the walls of the head against turning. It may be held in this position by any suitable means. The inside part of this ring has teeth 26.

Just beneath the ring there is mounted in this cavity a rotating disc 27, which is attached to the lower end of the shaft 21 and is rotated by the rotation of the shaft 21 through the worm gear 20. The point of attachment of the disc 27 to the shaft 21 is indicated by the numeral 28, and this disc may be attached in any suitable manner.

Between the center of the disc 27 and the outer circumference thereof there is provided a hole 29, which has therein a bushing 30. Rotatably mounted in this bushing 30 is a stub shaft 31, which has on the inside thereof a gear 32 which meshes with the teeth 26 on the ring 25. The extreme inner end of this shaft 31 is supported in a bearing by a bracket on the disc. On the outer end of the stub shaft 31 are two projections 33 which coact with the stub shaft 31 in supporting the stirrer or mixer. Generally the stirrer has in the end thereof a socket provided with a bayonet slot or slots. The end of the stirrer is slipped over the end of the shaft 31 with the pins 33 engaging in the slots so that on the rotation of the shaft 31 the stirrer rotates therewith with the pins in the bayonet parts of the slots.

For the purpose of accommodating the rotating tool or apparatus there is provided in the end of the shaft 21 a slot 40. The purpose of this slot is to receive the coacting part of a grinder, a juice extractor, ice cream freezer shaft, or any other apparatus to be operated by this shaft directly. The purpose of the shaft 31 is to give to the tool on the end thereof both a gyrating and a rotating motion. That is, the tool will move around the shaft 21 and at the same time rotate due to the action of the shaft 21, the disc 27, the ring 25 and the gears 32 on the shaft 31. By this means the motor will convey motion, first to the gear 20 and the shaft 21 and the disc 27 and to the shaft 31, which rotates and at the same time travels around the shaft 21.

At suitable points in the lower part of the head, just above the bowl, there are provided slots indicated by the numeral 34. Fitting over this part of the head is a circular plate 35, which is fastened thereto by means of screws 36. This plate has slots therein similar in shape and location to the slots 34 in the head. These slots are indicated by the numeral 37 and have enlarged parts 38. These enlarged parts are for the purpose of receiving the coacting part of an attachment, and after that part of the attachment has been inserted within the enlarged ends 38, the attachment is given a turn so that it engages a narrow part 37 of the slot.

For the purpose of aiding in holding the attachment in place there are provided struck-up parts, as indicated by the numeral 39. When the attachment is inserted in the enlarged parts 38 and a turn is given to the attachment so that a projection thereon enters into the slot part 37 and comes in contact with the struck-up parts 39, the attachment is held in this position so that it cannot be easily removed except as desired by the operator.

Figures 11, 12:
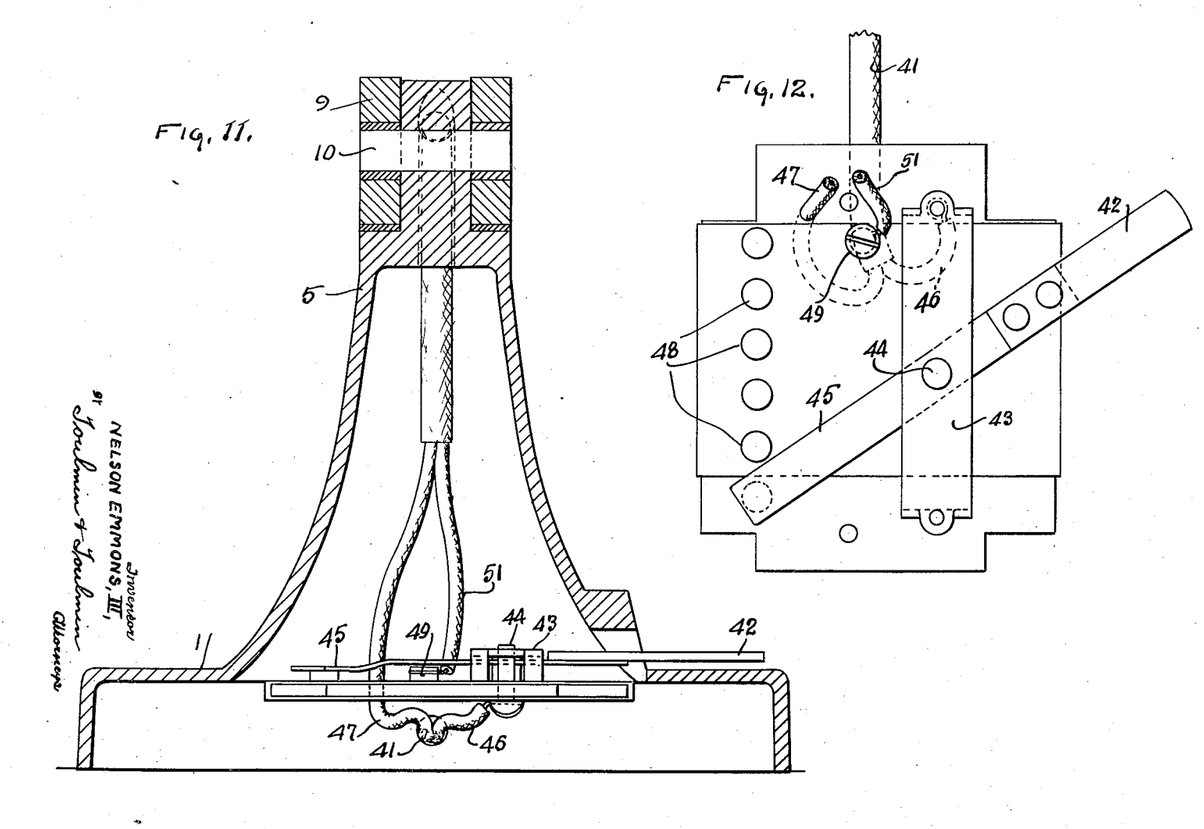
Figure 11 is a vertical section through the base and the standard, showing the switch for controlling the current to the motor.
Figure 12 is a top plan view of the switch apparatus shown in Figure 11.

In Figure 11 there is shown a means for connecting the house current to the apparatus. The house wire is indicated by the numeral 41. The numeral 42 is used to indicate the insulated part of the switch lever, which is pivoted to a plate 43 at a point indicated by the numeral 44. The numeral 45 indicates the contact part of the switch lever, and is adapted on the operation of the lever, to contact successively the resistance contacts 48. After the house current wire enters under the base of the appartus it branches off into a branch 46, which passes through the switch control, while the other branch 47 leads directly to the motor.

The numeral 49 is used to designate a binder post, to which one end of the resistance wire 50 is attached. There is also attached to the binder post 49 a second wire 51, which leads to the motor. The whole part of this apparatus, as shown in Figure 12, is composed of some insulating material together with the current conducting material heretofore described. Any form of suitable rheostat structure might be used for the purpose of regulating the degree of current admitted to the motor so as to control the speed of the motor.

In Figure 1 there is shown, in connection with the stirrer and the head and the bowl, a stirrer which has a shaft 52 with a socket 53 in the end thereof to receive the end of the shaft 31 and the pins 33. For this purpose the shaft is provided with bayonet slots which receive the pins 33 as the end of the stirrer shaft is slipped over the end of shaft 31. The nature of the bayonet slot is such that the rotation of the shaft 31 and the stirrer tends to hold the pins 33 in the slot so that the stirrer cannot become dislocated.

The feather part of the stirrer is indicated by the numeral 54. When the stirrer is attached to the shaft 31, which has both a rotating and revolving motion, it travels around the circumference of the bowl on the inside thereof and at the same time rotates, thoroughly mixing and stirring the contents of the bowl. The shape of the bowl and the shape of the stirrer is such that when the head of the apparatus is tilted the stirrer can be withdrawn from the bowl without coming in contact with the sides thereof and without removing the bowl from its place on the base and the standard.

This is one of the advantageous features of this device. Without disturbing the bowl the stirrer can be removed therefrom and be reinserted into the bowl very readily, and without other effort than simply throwing the head of the apparatus back, or bringing it down into former position again.

Figures 8, 9, 10:
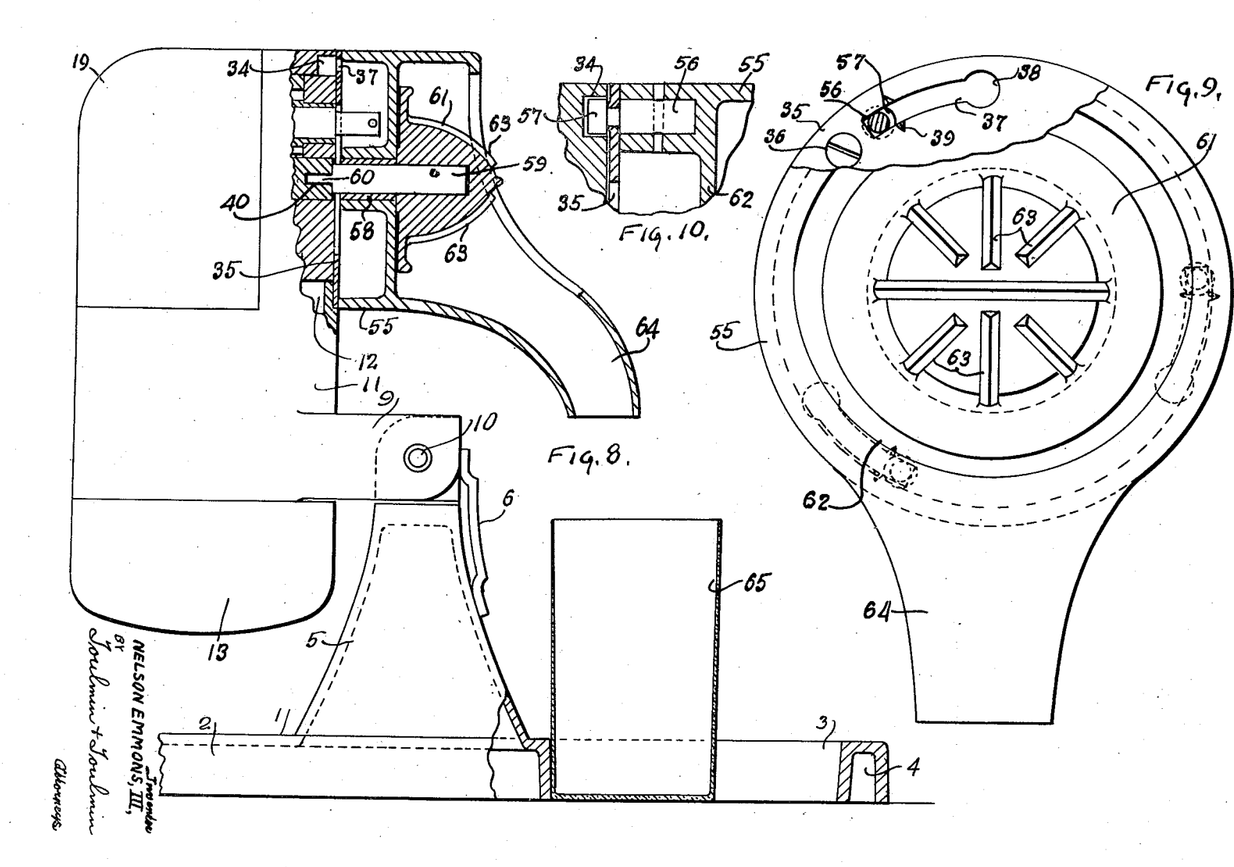
Figure 8 is a view of the apparatus partly in section, showing the fruit juice extractor attached thereto.
Figure 9 is a front view of the juice extractor, showing its manner of attachment to the head of the apparatus.
Figure 10 is a detail view of the pin and slots for holding the juice extractor in operating position.

In Figures 8, 9 and 10 there is shown a form of attachment 55 to be used in connection with the head when it is thrown back in a vertical and out of the horizontal position. Attachments of this kind are provided with pins, indicated by the numeral 56, which are inserted through the circular part 38 and rotated to engage the narrow part 37 so that the attachment is firmly held on the head, as heretofore described.

For the purpose of engaging beneath the plate 35 the pin 56 is provided with a head, indicated by the numeral 57. This head part passes through the opening 38 and the neck of the head engages the narrow part 37 of the slot. The attachment in the present instance has provided thereon a bearing 58 which carries a shaft 59. On the inner end of this shaft is a tongue 60, which engages in the slot 40 for the purpose of rotating the shaft 59. On the outer end of the shaft 59 is a cone-shaped reamer 61, which has on the conical surface thereof a plurality of knives or lacerators 63. This reamer is located in a housing on the outer part of the attachment, which housing is indicated by the numeral 62, and leads into a spout 64 which conveys the juice that has been extracted into a glass 65.

While I have shown and described here a juice extractor with the accompanying glass for receiving the juice, there might be an attachment used as this attachment here is used for the purpose of grinding meat, operating an ice cream freezer, and various other utensils of this kind that are found in homes and in kitchens.

Figure 5:
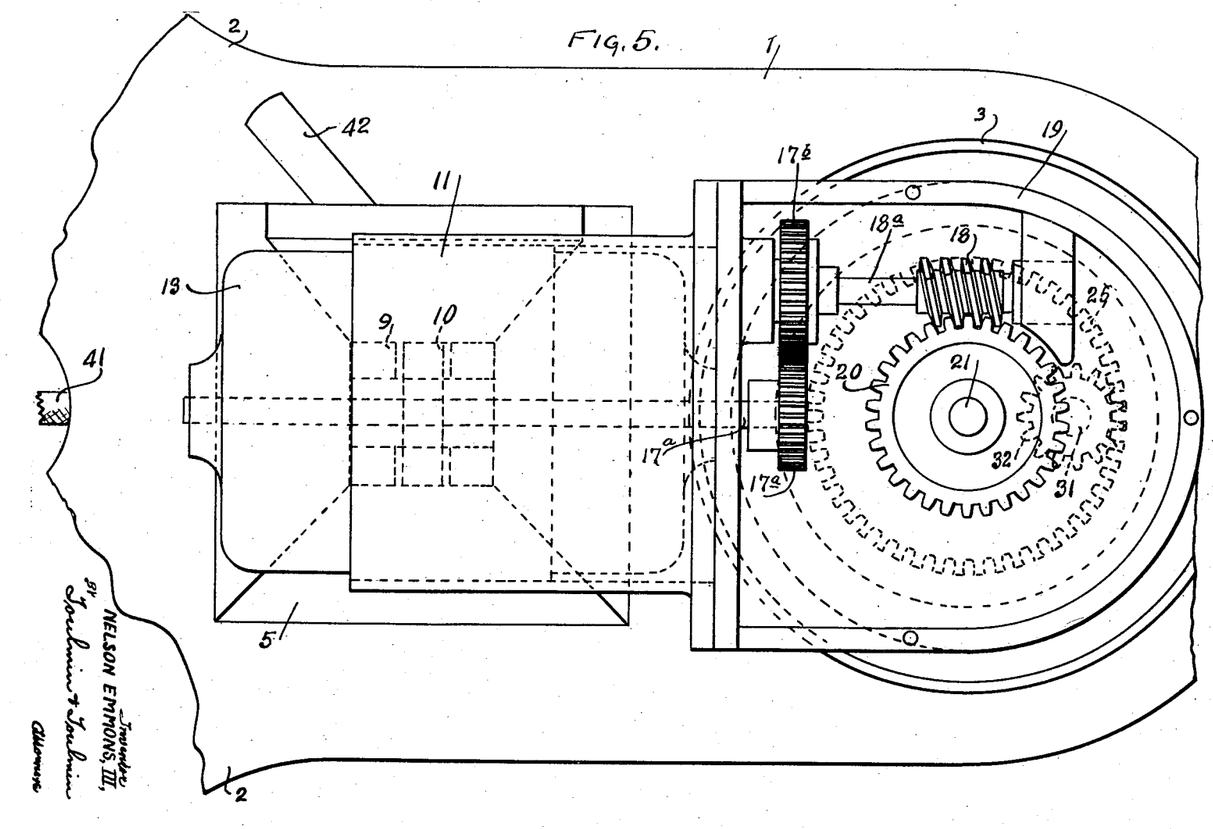
Figure 5 is a section through the gear mechanism, showing a modified form of drive connection between the motor shaft and the vertical shaft.
Figures 6, 7:
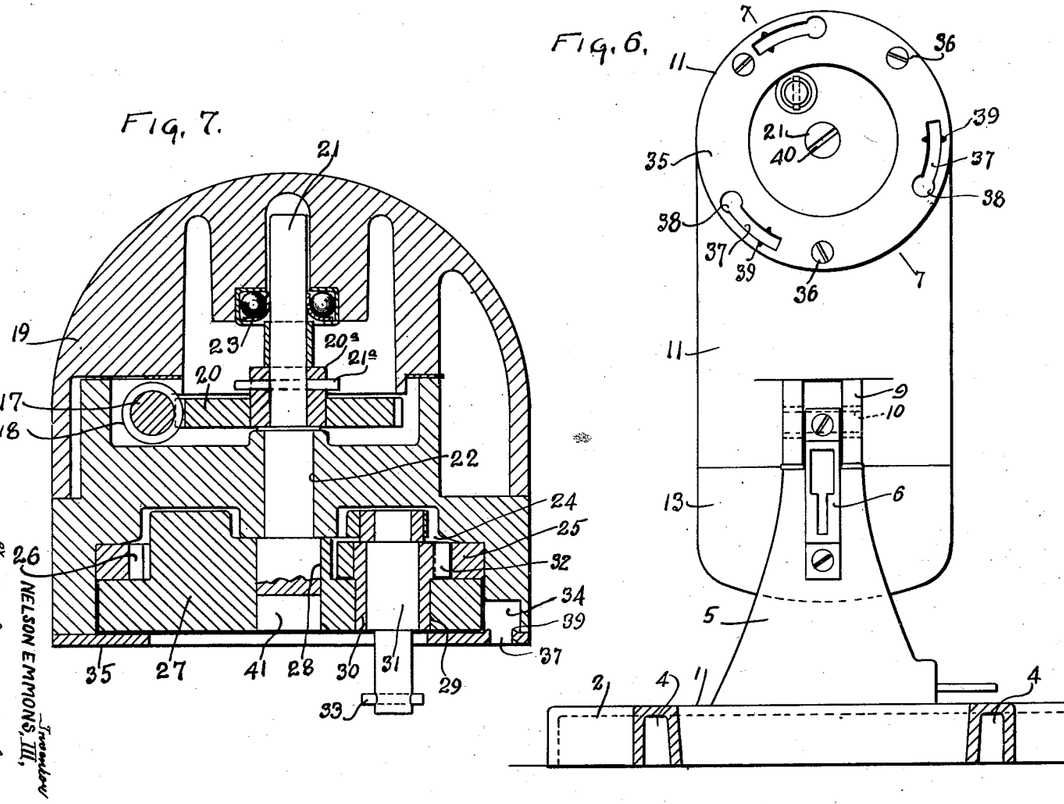
Figure 6 is an end elevation of the standard and base plate with the head thrown back, showing the base partly in section.
Figure 7 is a section on the line 7—7 of Figure 6.

In Figure 4 there is shown a direct drive from the motor or armature shaft 17 to the gear on the vertical shaft. In Figure 5 there is shown a modified form in which the motor shaft 17 has on the end thereof a pinion 17a, which meshes with another pinion 17b, which drives the shaft 18a carrying the worm 18 which meshes with and operates the worm gear 20.

Suitably attached to the base beneath the bowl seat is a heating element 66 which is in the form of an electrical heating coil. For the purpose of controlling the current to the heating coil there is provided a switch 67, similar to the switch that controls the current to the motor, and it is provided with means for regulating the current so that the heat may be varied to suit the needs of the contents of the bowl.

For the purpose of supporting the base above the part on which the apparatus rests, there may be provided a series of supports, indicated by the numeral 68. These supports may be in the form of rubber discs, or any other suitable material. The main object is to support the base sufficiently to provide room and space for the heating element. It is understood that the current for the heating element is the same as that for the motor, but is controlled by an independent switch which permits the use of the current for heating purposes independent of the operation of the motor.

I desire to comprehend within my invention such modifications as may be clearly embraced within my claims and the scope of my invention.

Having thus fully described my invention, what I claim is new and desire to secure by Letters Patent, is:

1. In a mixing apparatus, in combination with a base having a circular seat and a standard having a slotted bracket thereon, a bowl having a bracket and resting on said seat in the base and held in place by its bracket fitting in said slotted bracket on the standard, a head supported by said standard, a stirrer extending from said head into said bowl, and means for operating the stirrer.

2. In a mixing apparatus, a base having a seat thereon, a standard on said base, a bracket having a key hole slot therein on said standard, a bowl supported by said seat, and means on said bowl to engage the slot in said bracket to hold the bowl on the seat.

3. In a mixing apparatus, a base having a bowl seat thereon, a standard on said base, a slotted bracket on said standard, a bowl resting on said seat, and means extending from said bowl and engaging the slot in the bracket to hold the bowl in place.

4. In a mixing and stirring apparatus, a support, a head tiltably mounted on said support, a rotatable disc in said head adapted to transmit rotary and gyratory motions, power means in said head to rotate said disc, means on said disc to support and rotate a juice extractor, and means on said disc to support and gyrate a mixer.

5. In a mixing and stirring apparatus, a support, a head supported on said support and adapted to have a vertical and a horizontal position, a rotatable disc in said head adapted to transmit rotary and gyratory motions, power means in said head to rotate said disc, a mixer supported by said head and gyrated by said disc when the head is in horizontal position, and means on said head for supporting a juice extractor and means on the disc for rotating a juice extractor when the head is in vertical position.

6. In a mixing and stirring apparatus, a support, a head pivotally supported by said support, said head having a series of slots therein for supporting a juice extractor, a motor and motor shaft supported in said head, said shaft having a worm thereon, and a worm gear and shaft rotated by said worm, said shaft having a slot in one end to operate a juice extractor and a rotating and revolving member for operating a mixer.

7. In a mixing and stirring apparatus, a base having a seat therein for a bowl, a bowl supported in said seat, a heating element attached to said seat and adapted to heat said bowl, a head supported by said base, a mixer supported by said head and extending into said bowl, and means in said head for operating said mixer.

8. In a mixing and stirring apparatus, a base having a seat therein for a bowl, a bowl supported by said seat, an electric heating element attached to said seat and adapted to heat said bowl, a head supported by said base, a mixer supported by said head and extending into said bowl, an electric motor in said head for operating said mixer, and means to supply electric current to said motor and to said heating element.

9. In a mixing and stirring apparatus, a base having a seat therein for a bowl, a bowl supported by said seat, an electric heating element attached to said seat and adapted to heat said bowl, a head supported by said base, a mixer supported by said head and extending into said bowl, an electric motor in said head for operating said mixer, and means to supply and regulate the electric current to said motor and to said heating element.

10. In a mixing and stirring apparatus, a hollow standard composed of two sections pivoted to each other for vertical swinging movement, a head formed integral with one part of said standard, an electric motor in said head, switch means in the lower part of said standard, an electric conductor from said switch to said motor in said standard, a rotatable disc supported by said head and rotated by said motor, means on said disc for engaging and rotating a rotatable member, and a second means on said disc for supporting and gyrating an element.

11. In a mixing and stirring apparatus, a hollow support, a head mounted upon said support for vertical swinging movement and having an opening leading from said support, a motor and motor shaft housed within said head, said shaft having a worm thereon, a worm gear and shaft driven by said worm, a disc attached to said last named shaft and operated thereby, means on said disc to receive and operate a rotatable member, and means on said disc for supporting and operating a gyrating member.

12. In a mixer, a standard, a head supported by said standard, one end of said head being hollow, the other end of said head having a removable housing, a motor in said hollow end, a shaft in said other end of said head, a gear on said shaft operated by said motor, and a disc on said shaft adapted to transmit rotary and gyratory motions.

13. In a mixer, a standard, a head supported by said standard, one end of said head being hollow and open, a motor in said hollow, a cap for closing the end of said head, the upper part of the other end of said head being cut away, a housing for said cut-away part, a shaft for said motor having a worm thereon, a vertical shaft supported by said head and said housing, a gear on said vertical shaft engaging said worm, a disc on said vertical shaft on the under side of said head.

14. In a mixing and stirring apparatus, a standard, a head on said standard having a cavity in the under side thereof, a motor and motor shaft in said head, a worm on said shaft, a second shaft rotatably mounted in said head, a worm gear on said second shaft in mesh with said worm, a toothed ring in said cavity, a disc on one end of said second shaft and in said cavity, and a stub shaft rotatably supported by said disc, said stub shaft having a gear near one end in mesh with the toothed ring and a pin in the other end for supporting and gyrating a tool, said second shaft having a slot in the disc end thereof for the purpose of receiving and rotating a tool.

15. In a mixing and stirring apparatus, a standard, a head on said standard having a circular cavity in the under side thereof, a motor and motor shaft in said head, a worm on said shaft, a second shaft rotatably mounted in said head, a worm gear on said second shaft in mesh with said worm, a disc on one end of said second shaft and in said cavity, the disc end of said second shaft having a slot therein, an annular plate attached to said head and extending over the edge of the disc, said annular plate having a series of slots therein, an attachment having a series of means extending into said series of slots to support said attachment, a shaft rotatably supported by said attachment and having a tongue adapted to engage in the slot in said second shaft, and a reamer on said last named shaft.

16. In a mixer, in combination with a standard and a head tiltably mounted thereon, a power-operated shaft rotatably supported by said head, a disc on one end of said shaft flush with the surface of the head, said disc end of said shaft having a slot therein, an annular plate attached to said head and extending over the edge of said disc, said plate having a series of slots therein, an attachment having a series of pins adapted to extend into said series of slots to support said attachment, a shaft rotatably supported by said attachment and having a tongue adapted to engage in the slot in said second shaft, a juice extractor on said attachment shaft, and means to collect the juice and direct it to a receptacle.

17. In a mixing and stirring apparatus, a base having a seat for a bowl, an electric heating element attached to said seat, a head supported by said base, a mixer supported by said head and extending above said seat, and means for operating said mixer.

18. In a mixing and stirring apparatus, a base having a bowl seat, a heating element attached to said seat, a head supported by said base, and a mixer and mixer operating means carried by said head, said mixer extending above said seat.

19. In a mixing and stirring apparatus, the combination with a motor support, of a motor carried thereby and positioned with its axis in an oblique or diagonal direction, a driven shaft for operating a stirrer, a worm on the motor shaft and a worm gear on the stirrer shaft, the oblique position or direction of the motor shaft permitting of this direct gear connection and the elimination of any intermediate gears and of undue noises.

In testimony whereof, I affix my signature.

NELSON EMMONS, 3RD.